United States Patent
Gully

(10) Patent No.: US 9,511,499 B2
(45) Date of Patent: Dec. 6, 2016

(54) GUIDED CUTTING ASSEMBLY

(71) Applicant: Ralpheal Gully, Freeport, NY (US)

(72) Inventor: Ralpheal Gully, Freeport, NY (US)

(*) Notice: Subject to any disclaimer, the term of this patent is extended or adjusted under 35 U.S.C. 154(b) by 259 days.

(21) Appl. No.: 14/285,280

(22) Filed: May 22, 2014

(65) Prior Publication Data

US 2015/0336281 A1 Nov. 26, 2015

(51) Int. Cl.
*B26B 11/00* (2006.01)
*G01B 3/10* (2006.01)
*B26B 29/06* (2006.01)

(52) U.S. Cl.
CPC ............ *B26B 11/00* (2013.01); *B26B 29/06* (2013.01); *G01B 3/1084* (2013.01); *G01B 2003/1048* (2013.01); *G01B 2003/1074* (2013.01); *G01B 2003/1089* (2013.01)

(58) Field of Classification Search
CPC ............ G01B 2003/1071; G01B 2003/1074; G01B 2003/1089; G01B 2003/1084; G01B 2003/1048; G01B 3/1084; B26B 11/00; B26B 29/06; B01B 3/1084
USPC ........................................................... 7/163
See application file for complete search history.

(56) References Cited

U.S. PATENT DOCUMENTS

| | | | |
|---|---|---|---|
| 4,890,393 A * | 1/1990 | St. Jean | G01B 3/1071 33/42 |
| 5,289,637 A | 3/1994 | Coffey | |
| 5,349,760 A | 9/1994 | DeVito | |
| 5,406,711 A * | 4/1995 | Graham | B25H 7/02 33/42 |
| 5,542,184 A | 8/1996 | Beard | |
| 6,938,354 B2 * | 9/2005 | Worthington | C07K 16/40 33/668 |
| D559,072 S * | 1/2008 | Fraga | D8/99 |
| 7,340,836 B2 | 3/2008 | Whitemiller et al. | |
| D630,082 S | 1/2011 | Bourque | |
| 8,020,312 B1 * | 9/2011 | McGahan | B26B 29/06 30/286 |
| 8,832,958 B2 * | 9/2014 | Mabey | G01B 3/1005 33/758 |
| 2003/0019116 A1 * | 1/2003 | DeWall | G01B 3/1041 33/42 |
| 2003/0126757 A1 | 7/2003 | Farney et al. | |
| 2012/0240419 A1 | 9/2012 | Wagner | |

* cited by examiner

*Primary Examiner* — Hadi Shakeri

(57) ABSTRACT

A guided cutting assembly allows a user to simultaneously cut and measure drywall or the like. The assembly includes a blade and a housing. A tape is extendable from and retractable into the housing. The tape is graduated. A free end of the tape is couplable to the blade wherein the tape measures a distance the blade is positioned from the housing. A guide is coupled to the housing. A front surface of the guide is configured to abut a section of drywall.

12 Claims, 5 Drawing Sheets

GUIDED CUTTING ASSEMBLY

BACKGROUND OF THE DISCLOSURE

Field of the Disclosure

The disclosure relates to cutting assemblies and more particularly pertains to a new cutting assembly for allowing a user to simultaneously cut and measure drywall or the like.

SUMMARY OF THE DISCLOSURE

An embodiment of the disclosure meets the needs presented above by generally comprising a blade and a housing. A tape is extendable from and retractable into the housing. The tape is graduated. A free end of the tape is couplable to the blade wherein the tape measures a distance the blade is positioned from the housing. A guide is coupled to the housing. A front surface of the guide is configured to abut a section of drywall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
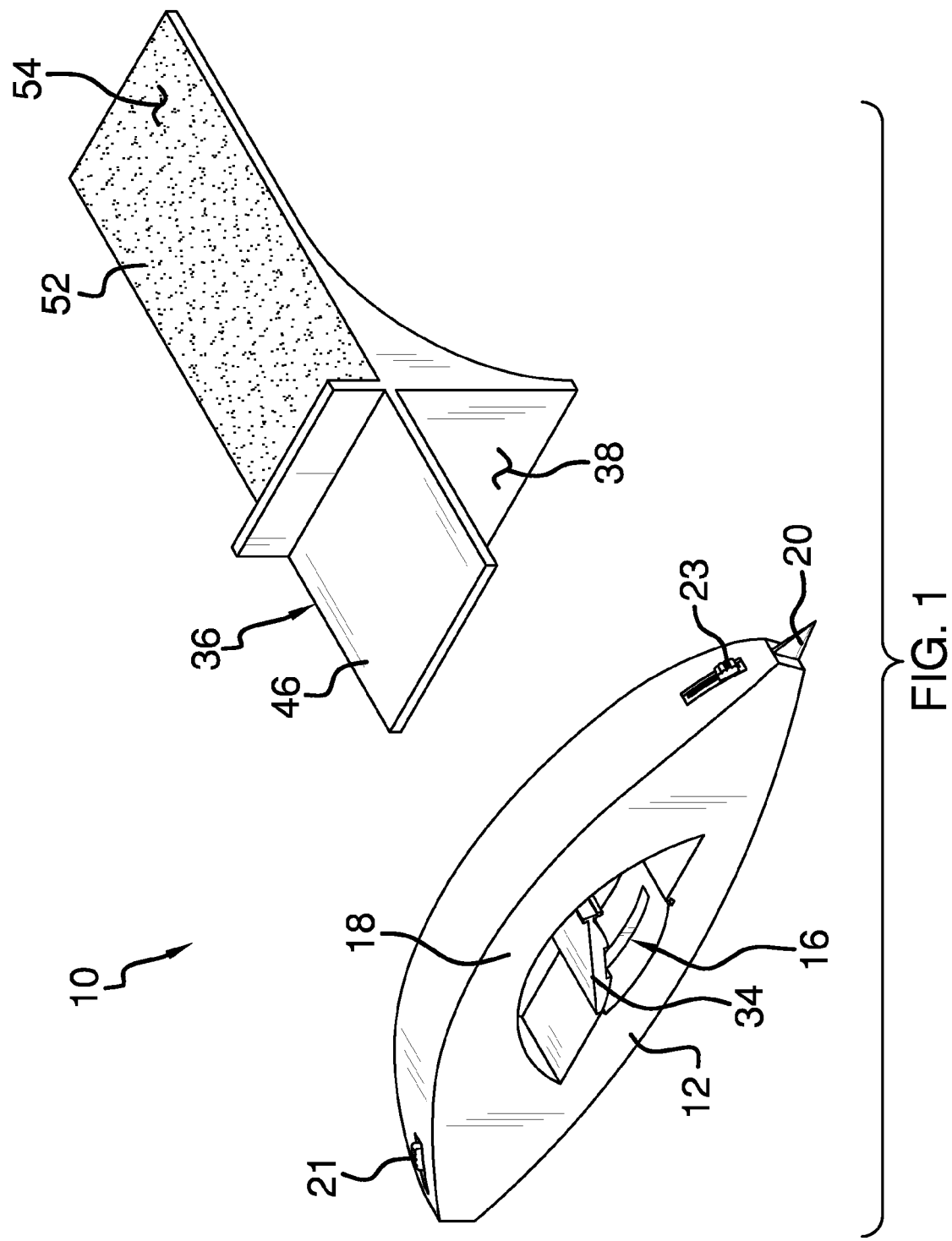
FIG. 1 is a top front side perspective view of a guided cutting assembly according to an embodiment of the disclosure.
Figure 2:
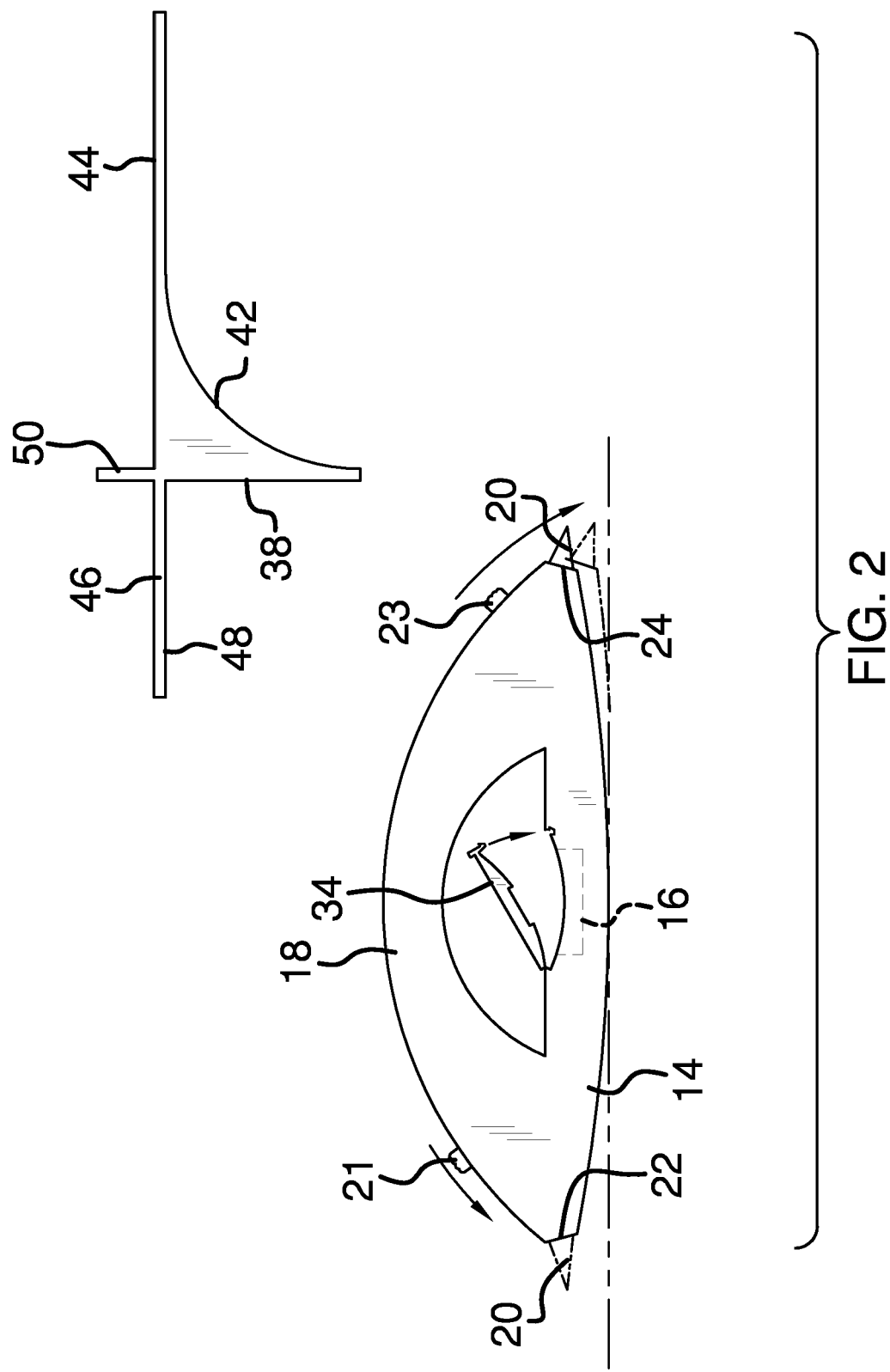
FIG. 2 is a front view of an embodiment of the disclosure.
Figure 3:
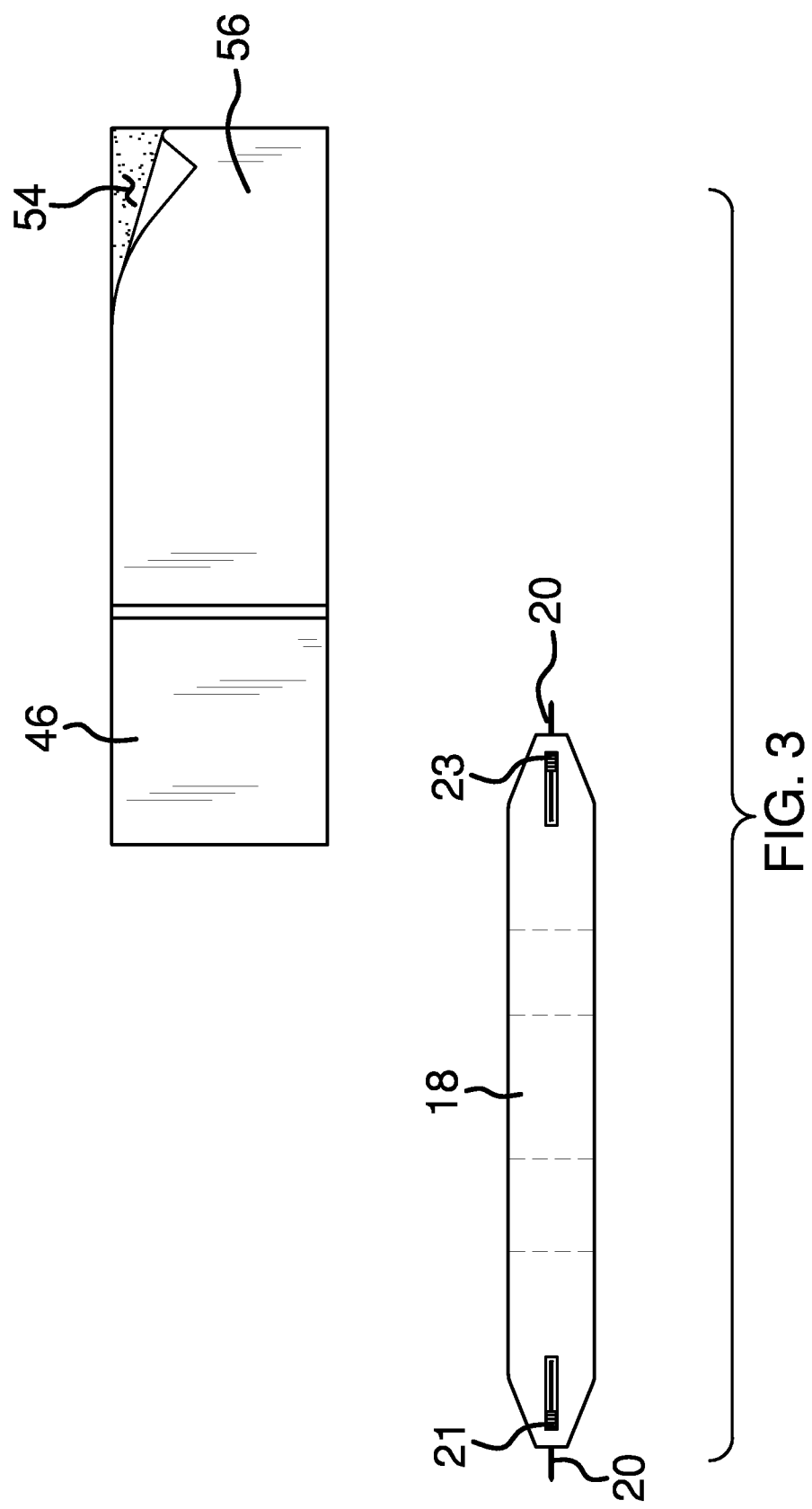
FIG. 3 is a top view of an embodiment of the disclosure.
Figure 4:
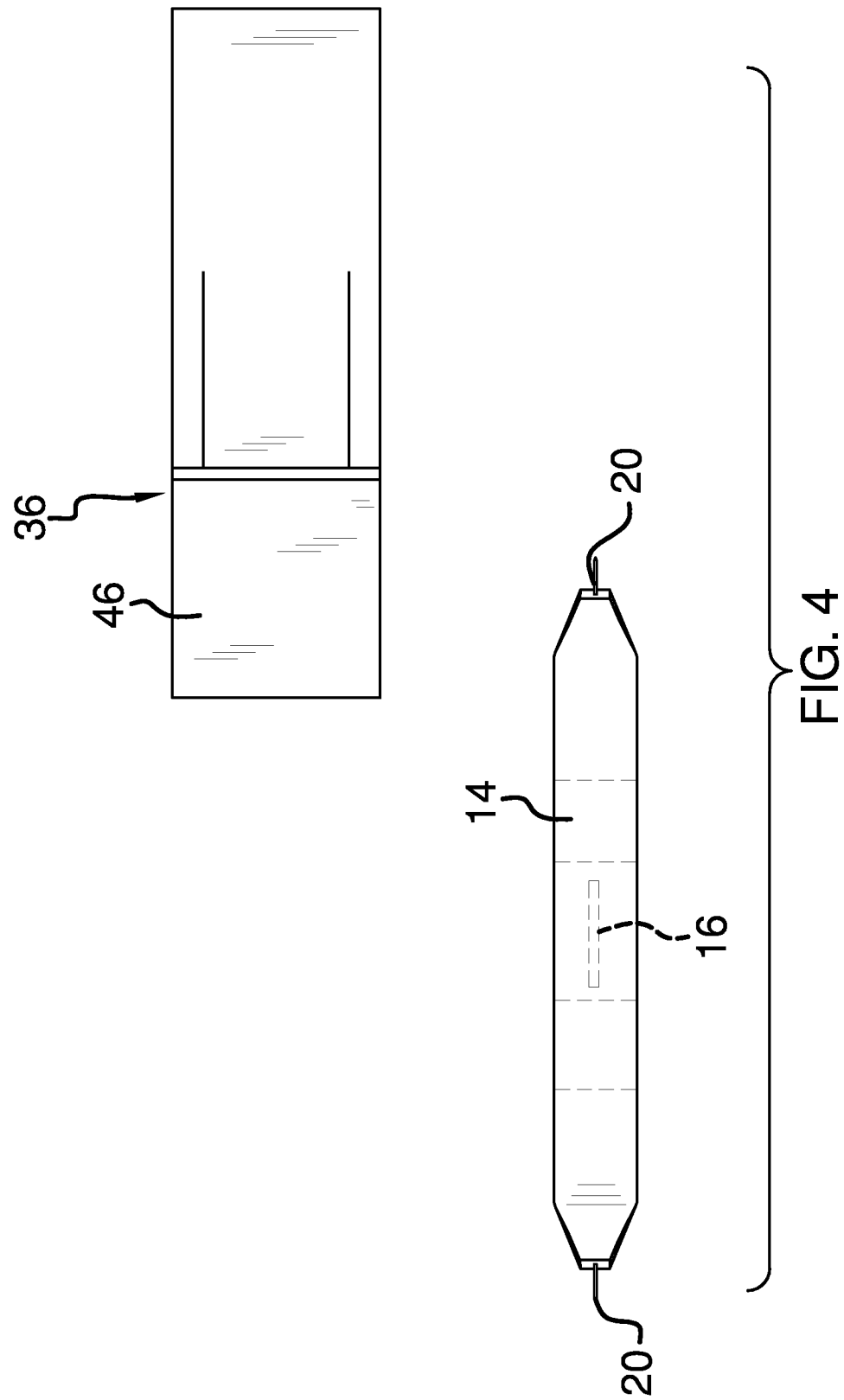
FIG. 4 is a bottom view of an embodiment of the disclosure.
Figure 5:
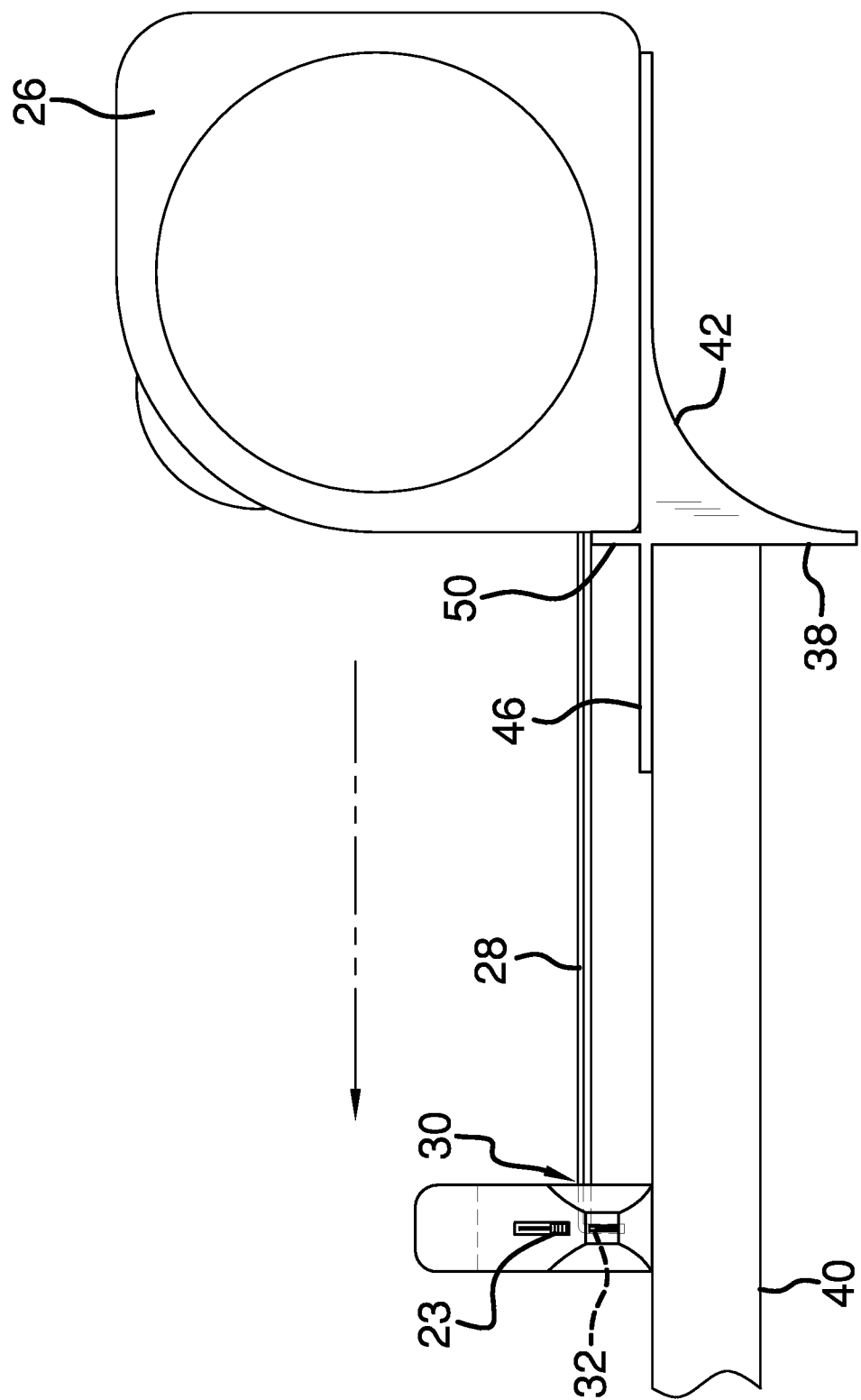
FIG. 5 is an in-use view of an embodiment of the disclosure.

With reference now to the drawings, and in particular to FIGS. 1 through 5 thereof, a new cutting assembly embodying the principles and concepts of an embodiment of the disclosure and generally designated by the reference numeral 10 will be described.

As best illustrated in FIGS. 1 through 5, the guided cutting assembly 10 generally comprises a handle 12. A bottom 14 of the handle 12 may be convexly arcuate to allow the handle 12 to tilt backward and forward on a section of drywall 40 when the handle 12 is positioned on top of the section of drywall 40. The handle 12 has a slot 16 extending therein. A grip 18 is attached to the handle 12 and may be integrally attached to the handle 12. At least one, but preferably a pair of blades 20 is coupled to the handle 12. One of the blades 20 is attached to a first end 22 of the of the handle 12. One of the blades 20 is attached to a second end 24 of the handle 12. Each of the blades 20 may be retractable into and out of the handle 12 in a conventional manner, such as by using one or more levers 21, 23 to control movement of the blades 20 into and out of the handle 12.

A housing 26 is provided. A tape 28 is extendable from and retractable into the housing 26. The tape 28 is graduated. A free end 30 of the tape 28 is couplable to the handle 12 wherein the tape 28 measures a distance the blades 20 are positioned from the housing 26. A projection 32 is coupled to and extends from the free end 30 of the tape 28. The projection 32 is insertable into the slot 16 to releasably couple the tape 28 and the handle 12. A locking mechansim 34 is coupled to the handle 12 wherein the locking mechanism 34 is configured to secure the projection 32 within the slot 16. The locking mechanism 34 may comprise a latch.

A guide 36 is coupled to the housing 26. A front surface 38 of the guide 36 is configured to abut the section of drywall 40. The guide 36 has a bottom surface 42 coupled to and extending between the front surface 38 of the guide 36 and a top surface 44 of the guide 36. The bottom surface 42 may be concavely arcuate between the front surface 38 and the top surface 44 of the guide 36. An extension 46 is coupled to and extends outwardly from the front surface 38 of the guide 36. A lower surface 48 of the extension 46 is configured to abut the section of drywall 40. A flange 50 is coupled to and extends upwardly from the top surface 44 of the guide 36. The flange 50 may be vertically aligned with the front surface 38 of the guide 36. The flange 50 provides a planar surface for the tape 28 to rest upon and glide upon when the tape 28 is retracted outwardly of the housing 26. The guide 36 may be constructed from a rigid material, such as plastic or the like.

An adhesive 54 is positioned on the top surface 44 of the guide 36 and attaches the housing 26 to the top surface 44 of the guide 36. A cover 56 may be provided that is removable from the adhesive 54 to expose the adhesive 54 prior to coupling the adhesive 54 to the housing 26.

In use, as stated above and shown in the Figures, the section of drywall 40 is positioned to abut the front surface 38 of the guide 36 and the lower surface 48 of the extension 46. The cover 56 is removed from the adhesive 54. The housing 26 is then attached to the top surface 44 of the guide 36 using the adhesive 54. The tape 28 is extended outwardly of the housing 26 to measure a desired distance of the section of drywall 40. The handle 12 is positioned above the section of drywall 40 at the desired distance such that the blades 20 are positioned above the section of drywall 40 to be cut. The projection 32 is inserted into the slot 16 and secured to the handle 12 using the locking mechanism 34. The blades 20 are then used to cut the section of drywall 40 in a conventional manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A guided cutting assembly comprising:
   a blade;
   a housing;
   a tape being extendable from and retractable into said housing, said tape being graduated, a free end of said tape being couplable to said blade wherein said tape measures a distance said blade is positioned from said housing;
   a guide coupled to said housing, a front surface of said guide being configured to abut a section of drywall, said guide having a bottom surface coupled to and extending between said front surface of said guide and a top surface of said guide, said bottom surface being concavely arcuate between said front surface and said top surface of said guide;
   a handle, said blade being coupled to said handle, said handle having a slot extending therein, a bottom of said handle being convexly arcuate;
   a projection coupled to and extending from said free end of said tape, said projection being insertable into said slot to releasably couple said tape and said handle;
   a locking mechanism coupled to said handle wherein said locking mechanism is configured to secure said projection within said slot; and
   an adhesive positioned on a top surface of said guide, said adhesive attaching said housing to said top surface of said guide.

2. The assembly of claim 1, further comprising said blade being one of a pair of said blades, each of said blades being coupled to said handle.

3. The assembly of claim 2, further comprising one of said blades being attached to a first end of said of said handle, one of said blades being attached to a second end of said handle.

4. The assembly of claim 2, further comprising each of said blades being extendable from said handle such that said blades are retractable into and out of said handle.

5. The assembly of claim 1, further comprising a grip being attached to said handle.

6. The assembly of claim 5, further comprising said grip being integrally attached to said handle.

7. The assembly of claim 1, further including a cover, said cover being removable from said adhesive to expose said adhesive prior to coupling said adhesive to said housing.

8. The assembly of claim 1, further comprising an extension coupled to and extending outwardly from said front surface of said guide, a lower surface of said extension being configured to abut the section of drywall.

9. The assembly of claim 1, further comprising a flange coupled to and extending upwardly from a top surface of said guide.

10. The assembly of claim 9, further comprising said flange being vertically aligned with said front surface of said guide.

11. The assembly of claim 1, further comprising wherein said locking mechanism comprises a latch.

12. A guided cutting assembly comprising:
   a handle, a bottom of said handle being convexly arcuate, said handle having a slot extending therein;
   a grip being integrally attached to said handle;
   a pair of blades coupled to said handle, one of said blades being attached to a first end of said of said handle, one of said blades being attached to a second end of said handle, each of said blades being extendable from said handle such that said blades are retractable into and out of said handle;
   a housing;
   a tape being extendable from and retractable into said housing, said tape being graduated, a free end of said tape being couplable to said handle wherein said tape measures a distance said blades are positioned from said housing;
   a projection coupled to and extending from said free end of said tape, said projection being insertable into said slot to releasably couple said tape and said handle;
   a locking mechanism coupled to said handle wherein said locking mechanism is configured to secure said projection within said slot, said locking mechanism comprising a latch;
   a guide coupled to said housing, a front surface of said guide being configured to abut a section of drywall, said guide having a bottom surface coupled to and extending between said front surface of said guide and a top surface of said guide, said bottom surface being concavely arcuate between said front surface and said top surface of said guide;
   an extension coupled to and extending outwardly from said front surface of said guide, a lower surface of said extension being configured to abut the section of drywall;
   a flange coupled to and extending upwardly from said top surface of said guide, said flange being vertically aligned with said front surface of said guide;
   an adhesive positioned on said top surface of said guide, said adhesive attaching said housing to said top surface of said guide; and
   a cover, said cover being removable from said adhesive to expose said adhesive prior to coupling said adhesive to said housing.

* * * * *